United States Patent
Savioli et al.

(10) Patent No.: US 12,358,666 B2
(45) Date of Patent: Jul. 15, 2025

(54) SELF-PROPELLED WRAPPING MACHINE AND WRAPPING AND CONTROL METHODS

(71) Applicant: ROBOPAC S.P.A., Acquaviva-Gualdicciolo (SM)

(72) Inventors: Valerio Savioli, Acquaviva-Gualdicciolo (SM); Alberto Brizi, Acquaviva-Gualdicciolo (SM); Massimo Grassi, Acquaviva-Gualdicciolo (SM)

(73) Assignee: ROBOPAC S.P.A., Acquaviva-Gualdicciolo (SM)

( * ) Notice: Subject to any disclaimer, the term of this patent is extended or adjusted under 35 U.S.C. 154(b) by 0 days.

(21) Appl. No.: 18/701,447

(22) PCT Filed: Oct. 14, 2022

(86) PCT No.: PCT/IB2022/059873
§ 371 (c)(1),
(2) Date: Apr. 15, 2024

(87) PCT Pub. No.: WO2023/067452
PCT Pub. Date: Apr. 27, 2023

(65) Prior Publication Data
US 2024/0417118 A1    Dec. 19, 2024

(30) Foreign Application Priority Data

Oct. 18, 2021   (IT) .......................... 102021000026663

(51) Int. Cl.
*B65B 57/12* (2006.01)
*B65B 11/00* (2006.01)
*B65B 57/18* (2006.01)

(52) U.S. Cl.
CPC ............ *B65B 11/008* (2013.01); *B65B 57/12* (2013.01); *B65B 57/18* (2013.01)

(58) Field of Classification Search
USPC .......................................... 53/398
See application file for complete search history.

(56) References Cited

U.S. PATENT DOCUMENTS

2006/0245866 A1   11/2006   Rose et al.
2017/0240170 A1   8/2017    Tani
(Continued)

FOREIGN PATENT DOCUMENTS

WO   WO-2020021584 A1 *   1/2020   ........... B65B 11/025

OTHER PUBLICATIONS

International Search Report mailed Mar. 24, 2023 in International Application No. PCT/IB2022/059873.

*Primary Examiner* — Chinyere J Rushing-Tucker
(74) *Attorney, Agent, or Firm* — Wenderoth, Lind & Ponack, L.L.P.

(57) ABSTRACT

A self-propelled wrapping machine movable on a supporting plane to wrap a load with a film has a self-propelled carriage provided with a drive wheel, an upright slidably supporting an unwinding unit provided with a reel of film, an actuator to operate the drive wheel and the unwinding unit along the upright, a control unit to control the actuator, and a scanning device to scan a defined area of the supporting plane to detect a possible obstacle in the area and in the presence of the obstacle to send an obstacle alarm signal to the control unit to stop the actuator. The scanning device is configured to scan a first area of the supporting plane during a wrapping cycle of a load and a second area during a manual maneuvering procedure, the second area being smaller than the first area.

20 Claims, 5 Drawing Sheets

(56) References Cited

U.S. PATENT DOCUMENTS

| | | |
|---|---|---|
| 2018/0059682 A1 | 3/2018 | Thode |
| 2019/0002138 A1* | 1/2019 | Laghi .................. B65B 41/16 |
| 2019/0193629 A1 | 6/2019 | Zevenbergen et al. |

* cited by examiner

SELF-PROPELLED WRAPPING MACHINE AND WRAPPING AND CONTROL METHODS

The invention relates to a mobile or self-propelled wrapping machine arranged to wrap a film made of a plastic material around a load consisting of a product or a group of products typically arranged on a skid or pallet. The invention further relates to a method for wrapping a load by means of a self-propelled wrapping machine and a method for controlling a self-propelled wrapping machine.

Self-propelled wrapping machines, also referred to as self-propelled wrapping robots, are machines generally used to wrap loads having variable shapes and sizes and in productions in limited amounts, typically in environments or rooms where fixed or static wrapping machines cannot be used because of the overall dimensions and/or available spaces. The loads are generally formed by skids or pallets on which a group of more or less regularly overlapped products and/or objects, even having different sizes and formats, is arranged.

In other cases, the wrapping, normally for protective purposes, directly concerns the product, which is generally large-sized.

The self-propelled wrapping machines include a cart or carriage which supports a vertical upright along which a film unwinding or supplying unit, which houses a reel of plastic film and is generally provided with a plurality of rollers for unwinding and pre-stretching the film, is movable, with alternating rectilinear motion.

The carriage is usually provided with motorized rear traction wheels and a front driving device which comprises one or more steering wheels, operated by a steering. The steering can be operated via a guiding bar, said drawbar, by an operator to manually drive the machine in a maneuvering configuration, or by a feeler element capable of following the profile or external shape of the load in an operational working configuration, in which the self-propelled machine turns autonomously and automatically around the load to wrap it with the film.

The combination of the alternating linear movement of the unwinding unit along the vertical upright and the rotation of the self-propelled machine around the load allows the film to be wrapped around the load so as to form a series of intertwined strips or bands. The plastic film is wrapped to completely bind up the load on all its sides.

The feeler element comprises an arm extending externally and laterally with respect to the carriage and is provided at the end with a wheel free to rotate about a vertical axis and capable of following the external outline of the load to be wrapped while the wrapping machine moves. The feeler element exerts a predefined elastic compression or thrust force on the load, so as to maintain contact with the aforementioned load and to allow the machine to move reliably around the load according to a wrapping trajectory determined by the outline of the load itself.

A safety bumper, known as a bumper, is fixed to the front of the carriage and is configured to promptly stop the wrapping machine during its automatic operation in a wrapping cycle as a result of contact or impact against an obstacle, for example an object or a person, which is located on, or crossing, the wrapping trajectory of the wrapping machine. In the event of an impact with a person, the bumper also prevents the person from suffering serious bruises, wounds, injuries.

The bumper has a U-shaped structure which extends outwards from a front portion of the carriage and surrounds and encloses the front driving device, in particular the front steering wheels, the steering, and the lower portion for connection to the steering of the guiding bar. The external walls of the bumper are flexible and elastically deformable so as to absorb the impact, i.e., the kinetic energy resulting from a collision. In the event of an impact with a person, the flexibility and deformability of the bumper prevent the person from being bruised or injured. The safety is also aided by the control of the movement speed of the self-propelled wrapping machine, which must be lower during the wrapping cycle at a set maximum speed, generally equal to 80 m/s.

Sensors are also included inside the bumper which are capable of promptly detecting any impact and/or deformation of the external walls of the bumper and sending an alarm signal to the control unit of the wrapping machine which stops the machine (emergency stop).

After an emergency stop, to restart the wrapping cycle an operator must manually reset the alarm and restart the wrapping machine.

A drawback of the known self-propelled wrapping machines provided with the bumpers described above lies in the fact that due to their conformation, such bumpers are not capable of protecting, in particular a person, from impacts against the feeler element which extends laterally and externally from the carriage towards the load.

Another drawback of the known self-propelled wrapping machines lies in the fact that after the emergency stop, following an impact or collision of an obstacle with the bumper, it is necessary to manually reset and restart the wrapping machine through its control panel. However, such a reset and restart procedure requires the presence and intervention of an operator, who is not always near the wrapping machine, which sometimes results in stop times and thus also long wrapping cycle durations.

US 2019/002138 discloses a self-propelled wrapping machine movable around a load for wrapping it with a film comprising a self-propelled carriage and provided with guiding means, a column fixed to the carriage and slidingly supporting a film unwinding unit, sensor means for detecting surfaces and/or external edges of the load throughout their extension and along a detection direction and processing related signals, and a control unit. The control unit receives the signals from the sensor means, and on the basis of the external surfaces and/or edges detected throughout their extension by the sensor means, calculates a peripheral contour of maximum overall dimensions of the load and processes, on the basis of the peripheral contour, a wrapping path of the wrapping machine around the load so as to avoid collisions with the load. The control unit controls the guiding means for directing the wrapping machine along the wrapping path.

An object of the invention is to improve the known self-propelled wrapping machines arranged to wrap a load with a film made of an extensible plastic material.

Another object is to create a self-propelled wrapping machine which is capable of immediately stopping during its operation in the presence of an obstacle placed in front not only of a front portion of the carriage, but also of the feeler element.

A further object is to create a self-propelled wrapping machine which ensures the safety of a person who is located on, or crossing, the wrapping trajectory of the machine during its operation.

Another object is to create a self-propelled wrapping machine which makes it possible to simplify and speed up a restart procedure following a stop.

Another object is to provide a method for wrapping a load by means of a self-propelled wrapping machine which allows its immediate stop in the presence of an obstacle which is located on the wrapping path of the machine during its operation and at the same time allows to simplify and speed up a restart procedure following the stop.

Another further object is to provide a method for controlling a self-propelled wrapping machine, in particular during a manual maneuvering procedure, so as to immediately stop the machine in the presence of an obstacle and/or in the event of excessive movement speed and at the same time allows to simplify and speed up a restart procedure following the stop.

A first aspect of the invention includes a self-propelled wrapping machine according to claim 1.

A second aspect of the invention includes a method for wrapping a load according to claim 15.

A third aspect of the invention includes a method for controlling a self-propelled wrapping machine according to claim 18.

The invention can be better understood and implemented with reference to the attached drawings which illustrate an exemplary and non-limiting embodiment thereof, in which.

Referring to FIGS. 1 to 4, a self-propelled wrapping machine 1 according to the invention is illustrated, movable on a supporting plane P, for example of a warehouse, for wrapping a load 100 with a film 50, in particular of cold-extensible plastic, during a wrapping cycle. The load 100 consists, for example, of one or more products arranged on a pallet or skid.

The self-propelled wrapping machine 1, or machine 1, comprises a self-propelled carriage 2 provided with at least one drive wheel 7 and a guiding system 5 which includes at least one steering wheel 8 operated by a steering 9 which can be manually operated by a guiding bar 6 in a manual maneuvering procedure of the machine 1. The guiding system 5 of the known type further comprises a feeler element 16 which is connected to the steering 9 and is configured to operate the steering while following the external profile or outline of the load 100 during a wrapping cycle, in which the machine 1 rotates autonomously and automatically around the load 100 to wrap it with the film.

The feeler element 16, of known type, comprises an arm 16a that extends externally and laterally with respect to the carriage 2 and is provided at its end with a wheel 16b free to rotate about a vertical axis and capable of following the external outline of the load 100 to be wrapped while the machine 1 moves.

The machine 1 further comprises an upright 3 fixed to the carriage 2, an unwinding unit 4 provided with a reel 51 of film 50 and movable along the upright 3, actuator means 20 at least to actuate the drive wheel 7 and the unwinding unit 4 along the upright 3 and a control unit 10 configured to control at least the actuator means 20.

The unwinding unit 4, of known type, is provided with a set of rollers arranged to unwind the film 50 from the reel 51 and prestretch and deviate the film towards the load.

Figure 2:
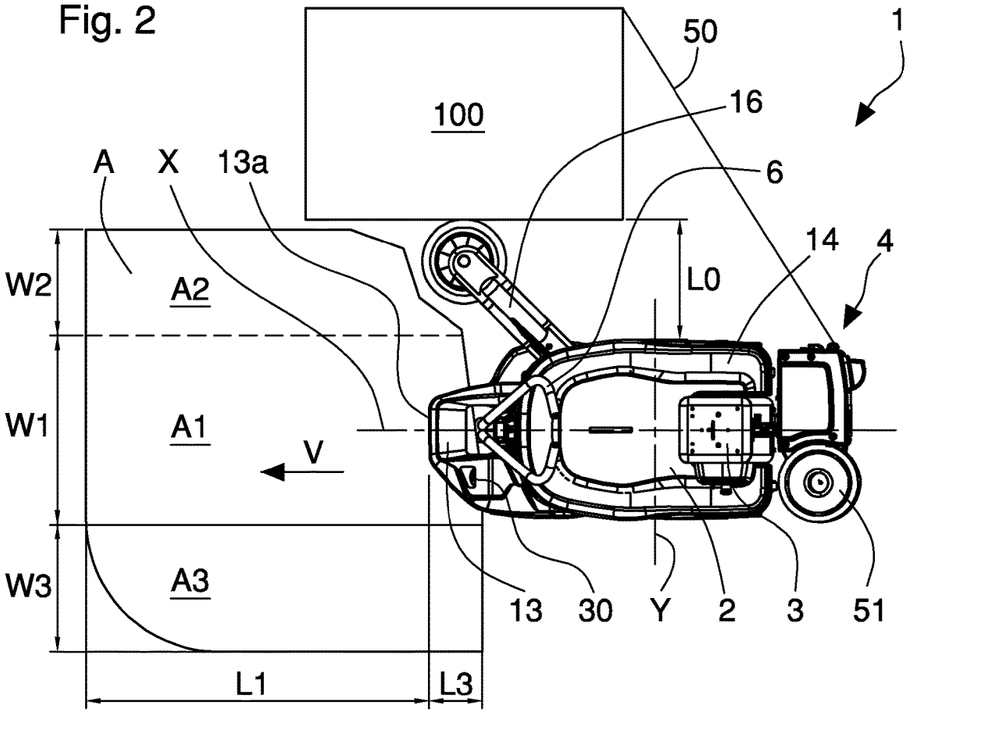
FIG. 2 is a plan view of the self-propelled wrapping machine of FIG. 1 illustrating in particular a first area scanned by a scanning device during a wrapping cycle of a load in automatic mode.
Figure 3:
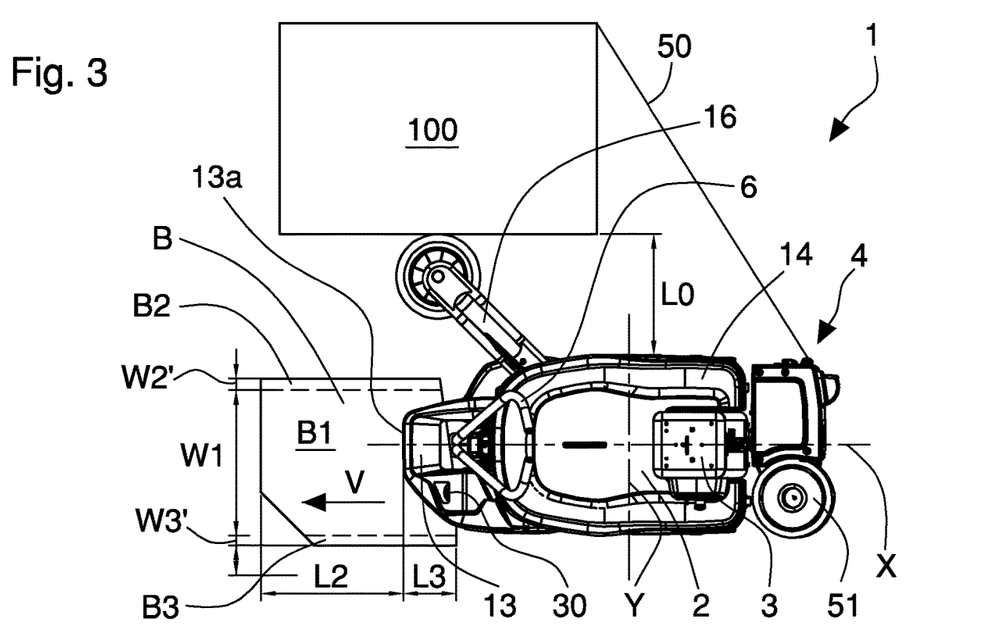
FIG. 3 is a plan view of the self-propelled wrapping machine of FIG. 1 illustrating in particular a second area scanned by a scanning device during a manual maneuvering procedure.

The machine 1 comprises at least one scanning device 30 configured to scan a defined area A, B of the supporting plane P that extends frontally and laterally from a front portion 13 of the carriage 2 in order to detect a possible obstacle in said area A, B and send, in presence of the obstacle, an obstacle alarm signal ALL1 to the control unit 10 to stop the actuator means 20 and the machine 1.

The scanning device 30 comprises, for example, a laser scanning device, of known type, capable of scanning in a very short time, e.g., 60-90 ms, an area or surface having a desired extension and shape and detecting therein one or more stopped or moving obstacles and sending a relative alarm signal.

Alternatively, the scanning device can comprise a radar or optical or infrared or ultrasonic or equivalent scanning/detecting device.

The scanning device 30 is in particular positioned on a front portion 13 of the carriage 2.

The scanning device 30 is configured to scan a first area A of the supporting plane P during a wrapping cycle of the load 100 that is performed automatically by the machine 1 and a second area B during a manual maneuvering procedure of the machine 1 that is performed by an operator; as evident from the figures, the second area B has an extent smaller than the extent of the first area A.

In fact, the machine 1 moves with different movement speeds V during the wrapping cycle of the load 100 performed automatically and during the normal maneuvering procedure.

More precisely, during the wrapping cycle the machine 1 moves at a speed which must be lower than a first limit speed $V_{1max}$, in particular equal to 90 m/s, while during the manual maneuvering procedure moves at a speed which must be lower than a second limit speed $V_{2max}$, in particular equal to 50 m/s. Therefore, during the wrapping cycle, the machine 1 generally moves at a higher speed and requires a greater stopping space than that necessary during the manual maneuvering procedure in order to avoid possible collisions with an obstacle placed along the path of the machine 1.

With particular reference to FIGS. 2 and 3, the first and second areas A, B comprise respective central portions A1, B1 that extend frontally from the front portion 13 of the carriage 2, first lateral portions A2, B2 adjacent to the central portions A1, B1 and interposed between the central portions and the load 100 and second lateral portions A3, B3 adjacent to the central portions A1, B1 and opposite to the load 100.

At least the first lateral portion A2 of the first area A is shaped so as to follow an external profile of the load 100 and of the feeler element 16 of guiding system 5 and the central portions A1, B1 of first and second area A, B are shaped so as to enclose the front portion 13 of carriage 20. Thereby, as is evident from the figures, an obstacle cannot come into contact with the machine 1 frontally, and in particular with the front portion 13 of the carriage 2 and with the feeler element 16, without crossing the areas A, B and thus without being detected by the scanning sensor 30.

The central and lateral portions A1, A2, A3 of the first area A have a first length L1, measured along a longitudinal axis X of the machine 1, i.e., parallel to a direction of the movement speed V of the machine 1, starting from an end 13*a* of the front portion 13 of the carriage 2 and moving away therefrom, for example between 1000 and 2000.

Differently, the central and lateral portions B1, B2, B3 of the second area B have a second length L2, measured along the longitudinal axis X of the machine 1 starting from the end 13*a* of the front portion 13 of the carriage 2 and moving away therefrom, for example between 50-800 mm.

The central portions A1, B1 and the second lateral portions A3, B3 of first and second area A, B have a third length L3 measured along the longitudinal axis X of the machine starting from the end 13*a* of the front portion 13 of the carriage 2 and towards a rear portion 14 thereof, comprised between 100 and 300 mm.

The central portions A1, B1 of first and second area A, B have a first width W1 measured along a transverse axis Y of the machine 1, i.e., orthogonally to the direction of the movement speed V of the machine 1, substantially equal to a width thereof.

The first lateral portion A2 of the first area A has a second width W2 measured along a transverse axis Y of the machine 1, in particular to the longitudinal axis X, for example substantially equal to a lateral extension distance L0 of the feeler element 16 extending from the carriage 2 towards the load 100.

The first lateral portion B2 of the second area B has a respective second width W2' measured along a transverse axis Y of the machine 1, in particular to the longitudinal axis X, for example between 0 mm and a distance substantially equal to a lateral extension distance L0 of the feeler element 16 which extends from the carriage 2 towards the load 100.

The second lateral portion A3 of the first area A also has a respective third width W3 measured along the transverse axis Y of the machine 1 between 350 and 1600 mm.

The second lateral portion B3 of the second area B has a respective third width W3' measured along the transverse axis Y of the machine 1 between 0 and 100 mm.

Figure 4:
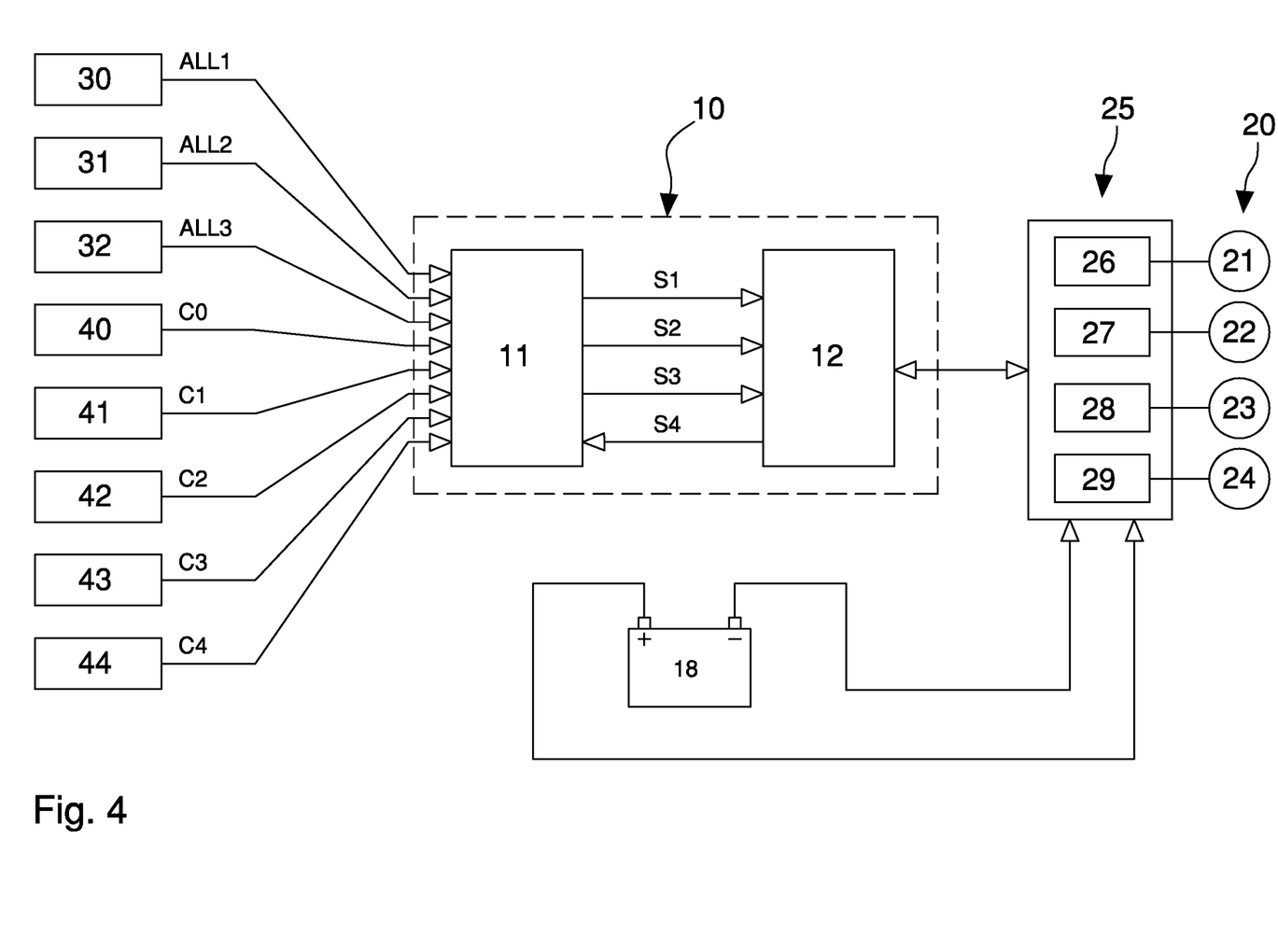
FIG. 4 is a simplified electrical diagram of the self-propelled wrapping machine of FIG. 1.

The machine 1 further comprises a plurality of sensors 31, 32 adapted to detect operating conditions and/or anomalies of the self-propelled wrapping machine 1 and a plurality of control buttons 40, 41, 42, 43, 44 to activate/deactivate operating functions of the self-propelled wrapping machine 1. The sensors 31, 32 and the control buttons 40, 41, 42, 43, 44 are connected to the control unit 10.

The control unit 10 comprises a first computing unit 11 connected to the scanning device 30 and to the plurality of sensors 31, 31 and control buttons 40, 41, 42, 43, 44 and adapted to receive from sensors and control buttons respectively alarm signals ALL1, ALL2, ALL3 and control signals C0, C1, C2, C3, C4 and a second computing unit 12 for controlling the actuator means 20. The first computing unit 11 and the second computing unit 12 are interconnected and communicating with each other and comprise, for example, respective industrial computers or PLC computers.

The second computing unit 12 is configured to control the actuator means 20 based on stop signal S1, start signal S2, restart signal S3 sent to the first computing unit 11 based on the signals received from the scanning device 30 and the plurality of sensors 31, 32 and control buttons 40, 41, 42, 43, 44. The second computing unit 12 sends a consent signal S4 to the first computing unit 11 which confirms the start of a wrapping cycle.

The plurality of sensors 31, 32 comprise at least one speed sensor 31 adapted to detect a movement speed V of the machine 1 and a position sensor 32 adapted to detect a low operating position of the guiding bar 6 that is arranged in this low operating position by an operator during a manual maneuvering procedure of the machine 1.

The speed sensor 31 is for example an angular speed sensor associated with the drive wheel 7 for measuring the number of revolutions per time unit.

The plurality of control buttons 40, 41, 42, 43, 44 comprise at least one emergency button 40 to stop said machine 1, a cycle start button 41 to start a wrapping cycle performed in automatic mode by the machine 1, a reset button 42 to reset the machine after an alarm signal AL1, AL2, AL3, in particular after an emergency stop, a first and a second drive button 43, 44 associated with the guiding bar 6 at least to control the movement of the machine 1 in a manual maneuvering procedure thereof.

When pressed, the emergency button 40 generates and sends to the first computing unit 11 an emergency stop command C0; when pressed, the cycle start button 41 generates and sends to the first computing unit 11 a start command C1 of the wrapping cycle performed in automatic mode; when pressed, the reset button 42 generates and sends to the first computing unit 11 a reset command C2 of the machine after an alarm signal ALL1, ALL2, ALL3; when pressed, the first and a second drive button 43, 44 generate and send to the first computing unit 11 respectively a first drive command C3 and a second drive command C4.

Figure 1:
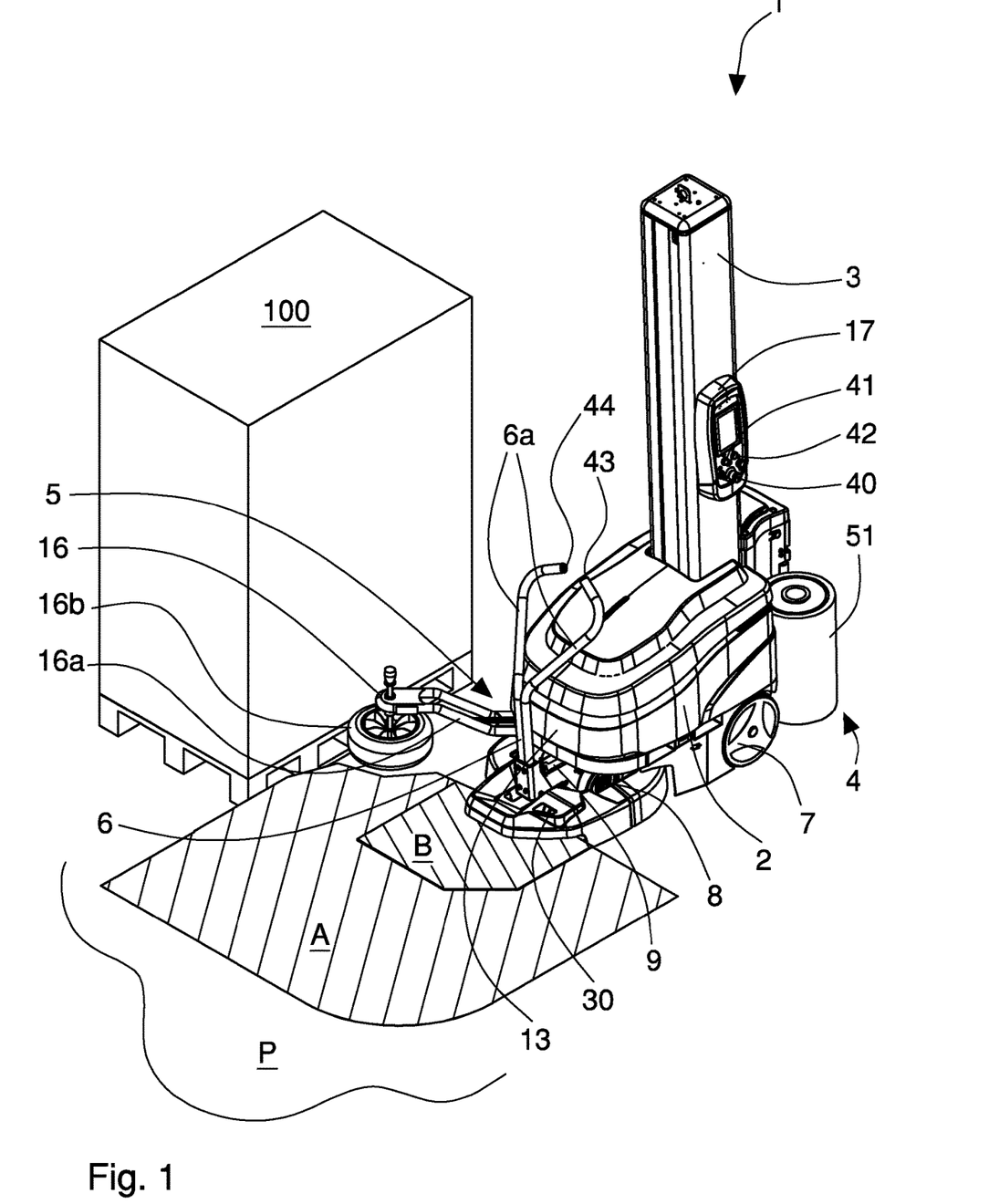
FIG. 1 is a perspective view of the self-propelled wrapping machine of the invention associated with a load.

The emergency button 40, the cycle start button 41 and the reset button 42 are positioned on a control panel 17, of known type, fixed to the upright 3. The first and the second drive button 43, 44 are positioned on the free ends of the two rods 6*a* forming the guiding bar 6. In the manual maneuvering procedure of the machine 1, by pressing the first button 43 the machine 1, for example, moves forward, while pressing the second button 44 the machine 1 moves backwards.

As better explained in the following description, the first button 43 is also configured to reset the machine 1 after an obstacle alarm signal ALL1, in particular after an emergency stop. To this end, the first button 43 must be kept pressed by the operator for at least a defined respective time, for example equal to 3 seconds, so as to generate the reset command C2.

Drive means 25 are provided for powering and controlling the actuator means 20 and are connected to and controlled by the second control unit 12.

With reference to the example illustrated in the figures, the actuator means 20 comprise a plurality of electrical actuators, for example rotary motors, 21, 22, 23, 24 arranged to operate different means and devices of the machine 1. For example, the actuator means 20 can comprise a first motor 21 for operating the rear drive wheel 7, a second motor 22 for moving the unwinding unit 4 along the upright 3, a third motor 23 and a fourth motor 24 for operating the pre-stretching rollers and/or a device for rolling the film of the unwinding unit 4. The pre-stretching rollers and the device for rolling the film are of known type and are not illustrated in the figures.

The drive means 25 thus comprise a first drive unit 26, a second drive unit 27, a third drive unit 28 and a fourth drive unit 29, of known type, to power and control the first motor 21, the second motor 22, the third motor 23 and the fourth motor 24, respectively.

The drive means 25 are electrically powered by electric accumulators 18 comprising one or more lead or lithium batteries.

Figure 5:
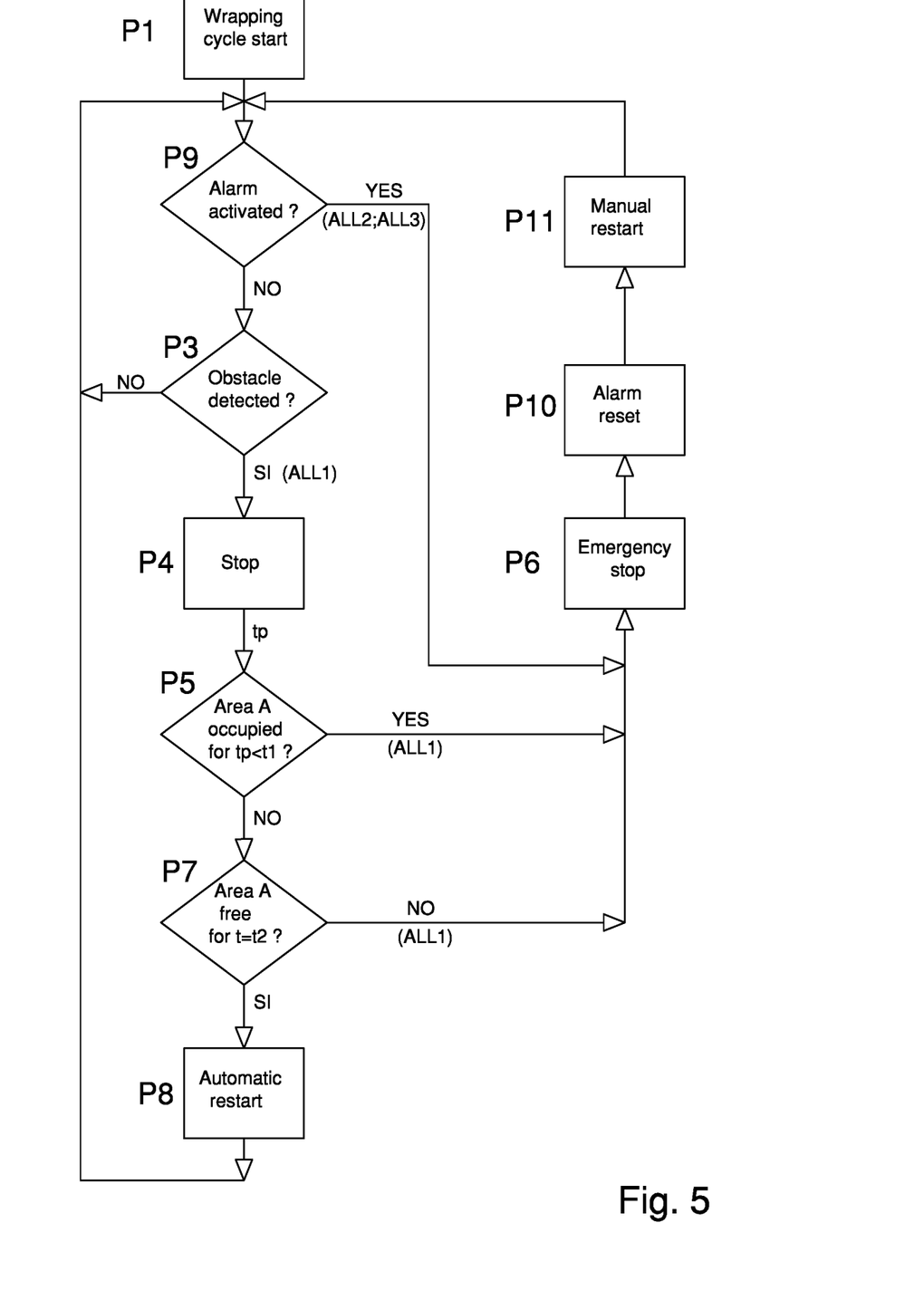
FIG. 5 is a flow chart illustrating the automatic operation of the wrapping machine of the invention during a load wrapping cycle.

With particular reference to the flow chart of FIG. 5, during the operation in automatic mode of self-propelled wrapping machine 1 of the invention, the wrapping cycle of the load with film 50 is started (P1) by the operator by pressing the start button 41 on the control panel 17. The start button 41 generates and sends the start command C1 to the first computing unit 11. The first computing unit 11 (in the absence of alarm signals) sends the start signal S2 for operating the actuator means 20 to the second computing unit 12. The second computing unit 12 (in the absence of internal alarm signals from actuator means 20 and drive means 25) activates the actuator means 20 and sends the consent signal S4 to the first computing unit 11 which confirms the start of a wrapping cycle.

During the wrapping cycle, while the machine 1 rotates around the load 100 to wrap it with the film 50, it is provided to scan (P3) the first area A of the supporting plane P with the scanning device 30 in order to detect a possible obstacle, for example an object or a person.

In the presence of an obstacle within the first area A, an obstacle alarm signal ALL1 is generated by the scanning device 30 which is sent to the control unit 10 and more precisely to the first computing unit 11. The signal is processed by the first computing unit that sends a stop signal S1 to the second computing unit 12, which controls and stops the actuator means 20. The machine 1 and the wrapping cycle are then stopped (P4) and a stay time tp, in which the obstacle remains within the first area A, is counted by the first computing unit 11.

If the stay time tp is not less than a first time t1, for example equal to 15 s, the machine 1 is put in emergency stop (P6) and the wrapping cycle is interrupted while the obstacle alarm signal ALL1 remains. A stay time greater than t1 indicates, for example, that the obstacle is not in transit through the first area A but has stopped therein.

On the contrary, if the stay time tp is less than the first time t1, the first computing unit 11 checks (P7) whether the first area A remains free of obstacles for a second time t2, in particular equal to 3 s.

If the first area A remains free of obstacles for the second time t2 (P8) the first computing unit 11 automatically sends a restart signal S3 to the second computing unit 12 to reactivate the actuator means 20, i.e., to restart the machine 1 and resume the wrapping cycle.

It should be noted that in this case, i.e., after a stop following the detection by the scanning device 30 of an obstacle, which remains briefly along the path of the machine in the first area A, i.e., within the first area A, the restart of the machine 1 is performed automatically without requiring the intervention of an operator who typically must push the reset button 42 and therefore the start button 41 on the control panel 17.

If, on the other hand, the first area A is occupied by an obstacle during the second time t2, the machine 1 is put in emergency stop (P6) and the wrapping cycle is interrupted while the obstacle alarm signal ALL1 remains.

It is also provided during the wrapping cycle to verify an operating state (P9) of the machine 1 and stop the machine in emergency mode P6 in case of additional alarm signals ALL2, ALL3 generated by sensors 31, 32 and sent to the first computing unit 11 of the control unit 10.

More precisely, when the speed sensor 31 measures a movement speed V of the machine 1 not lower than a first limit speed $V_{1max}$, in particular equal to 90 m/s, a speed alarm signal ALL2 is generated and sent to the first computing unit 11 whereby the machine 1 is stopped in emergency (P6) and the wrapping cycle interrupted, the first control unit 11 sending the stop command S1 to the second control unit 12.

After an emergency stop (P6) following an alarm signal ALL1, ALL2, ALL3 (in the case of the obstacle alarm signal ALL1 when such obstacle alarm signal remains as described above), this signal must be reset manually (P10) by an operator who must press the reset button 42 on the control panel 17.

In case of a stop following the obstacle alarm signal ALL1, such a signal can be reset by the operator by prolongedly pressing the first drive button 43 on the guiding bar 6.

By means of the reset button 42 or the first drive button 43, the reset command C2 is generated and sent to the first computing unit 11 after which the machine 1 can be manually restarted (P11) by pressing the start button 41 to continue the wrapping cycle. The start button 41 generates and sends the start command C1 of the wrapping cycle to the first computing unit 11. The first computing unit 11 sends the start signal S2 to the second computing unit 12 to activate the actuator means 20.

Figure 6:
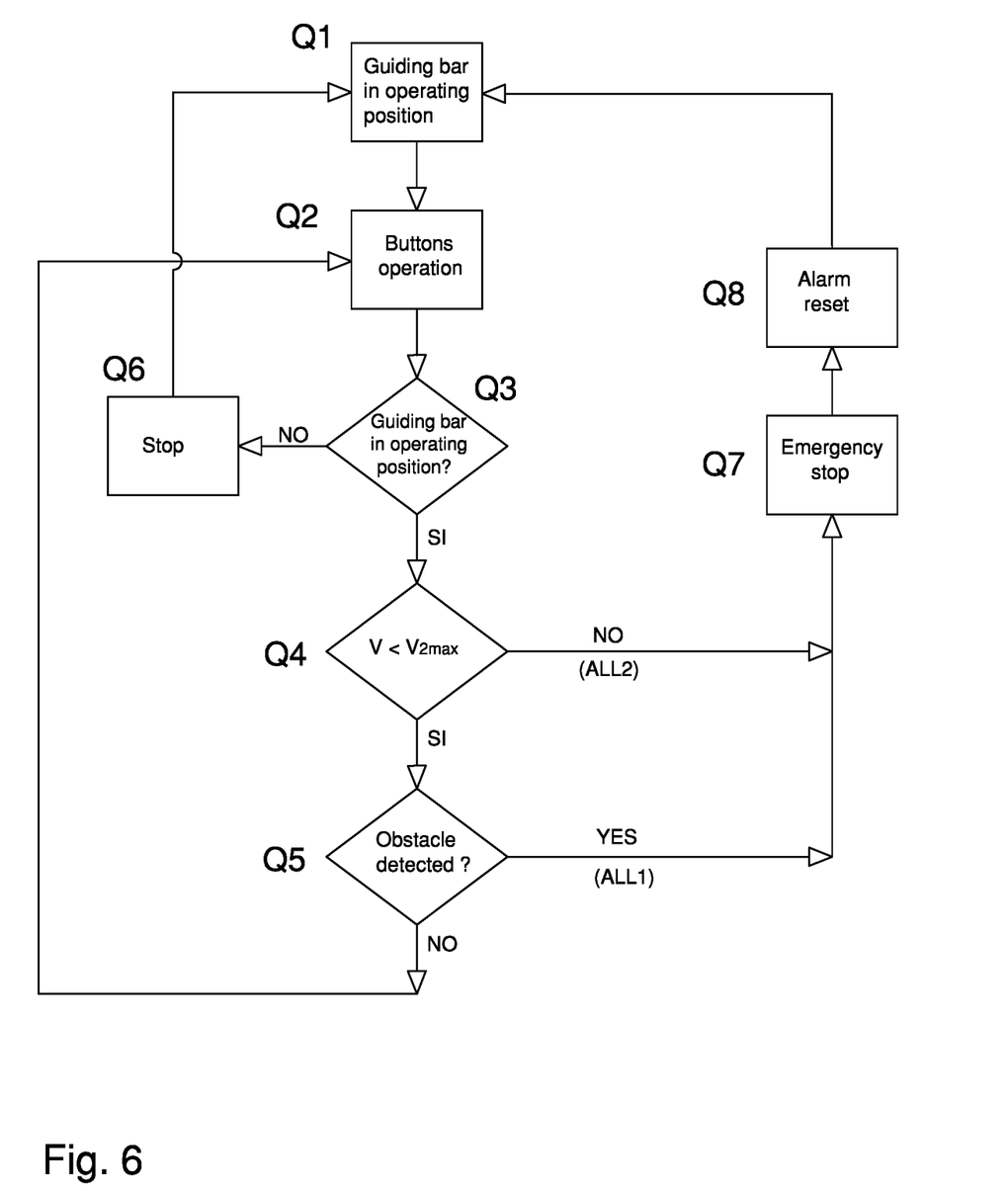
FIG. 6 is a flow chart illustrating the operation of the wrapping machine of the invention in a manual maneuvering procedure.

With particular reference to the flow chart of FIG. 6, in the manual maneuvering procedure an operator guides and moves the machine 1 on the supporting plane P by acting via the guiding bar 6 on the steering 9 of the guiding system 5 and operating, via the drive buttons 43, 44 placed on the guiding bar 6, the actuator means 20, in particular the first motor 21 acting on the drive wheel 7.

The operation of the machine 1 in such manual maneuvering procedure requires the operator to move the guiding bar 6 to a low operating position so as to activate the drive buttons 43, 44 and said manual maneuvering procedure (Q1).

The scanning device 30 is also activated to scan the second area B of the supporting plane P and detect a possible obstacle in said second area B and generate and send to the control unit 10, in particular to the first computing unit 11, an obstacle alarm signal ALL1 in case of presence of the obstacle.

The operator can then operate (Q2) the drive buttons 43, 44 in order to activate the actuator means 20, in particular the first motor 21 acting on the drive wheel 7, and move the machine 1. By pressing and holding the first button 43 (which sends a first drive signal C3 to the first computing unit 11) the machine moves forward, while pressing and holding the second button 44 (which sends a second drive signal C4 to the first computing unit 11) the machine 1 moves backwards.

During the movement, the first computing unit 11 controls the position of the guiding bar 6 by means of position sensor 32. If the guiding bar 6 is not in the required low operating position, the position sensor 32 generates and sends a signal to the control unit 10 which causes the immediate stop (Q7) of the machine 1 since an upwards movement of the guiding bar 6 could imply a dangerous approach of the operator to the moving machine 1. The stop also causes the deactivation of the control buttons 43, 44.

The control buttons are reactivated to allow the machine 1 moving again when the guiding bar 6 is returned by the operator to the low operating position (Q1).

During the movement, the first computing unit 11 also checks by means of the speed sensor 31 (associated with the drive wheel 7) that the movement speed V of the machine 1 is lower than a predetermined second maximum speed $V_{max2}$, in particular equal to 50 m/s. If the movement speed V is equal to or greater than the second maximum speed $V_{max2}$, the speed sensor 31 generates and sends a speed alarm signal ALL2 to the control unit 10 which stops the machine 1 in emergency mode (Q8) and deactivates the drive buttons 43, 44. More precisely, the first computing unit 11 receiving the speed alarm signal ALL2, generates and sends the stop signal S1 to the second computing unit 12 which commands the stop of the actuator means 20.

After the emergency stop (Q8) the operator must manually reset (Q9) the speed alarm signal ALL2 by pressing the reset button 42 on the control panel 17. Then the operator must position the guiding bar 6 in the low operating position (Q1) to reactivate the drive buttons 43, 44.

During the movement of the first computing unit 11, the scanning device 30 scans (Q6) the second area (B) to detect a possible obstacle present therein and in the event of presence, to generate the obstacle alarm signal ALL1 and send it to the control unit 10 of the machine 1 which stops the machine 1 in emergency mode (Q8) and deactivates the drive buttons 43, 44. More precisely, the first computing unit 11 receiving the obstacle alarm signal ALL1, generates and sends the stop signal S1 to the second computing unit 12 which commands the stop of the actuator means 20. Also in this case, after the emergency stop (Q8), the operator must manually reset (Q9) the obstacle alarm signal to 1 by pressing the reset button 42 on the control panel 17 or by holding down the first drive button 43 on the guiding bar 6 after positioning the guiding bar 6 in the low operating position (Q1) to reactivate the drive buttons 43, 44.

The self-propelled wrapping machine 1 according to the invention is therefore capable of avoiding collisions with obstacles, objects or people, which are on or crossing its movement trajectory both during a wrapping cycle carried out in automatic mode and in manual maneuvering procedure. More precisely, the machine 1 is capable of immediately stopping during automatic and manual operation when the scanning device 30 detects an obstacle within a defined area (the first area A or the second area B) preventing it from coming into contact with the machine.

The scanning device 30 allows to scan an area (first area A, second area B) of selectable size comprising a central portion A1, B1 placed directly in front of the carriage 2 of the machine 1 and large lateral portions A2, B2, A3, B3.

In particular, at least the first lateral portion A2 of the first area A is shaped so as to follow an external profile of the load 100 and of the feeler element 16 of the guiding system 5, while the central portions A1, B1 are shaped so as to enclose the front portion 13 of the carriage 20. Thereby, it is not possible for an obstacle to come into contact with the machine 1 frontally, and in particular with the front portion 13 of the carriage 2 and with the feeler element 16, without crossing the areas A, B and thus without being detected by the scanning sensor 30. Unlike the known self-propelled wrapping machines, it is therefore not possible for an obstacle to come into contact with the arm 16a. Moreover, the second lateral area A3, in particular of the first area A, ensures an adequate distance of the obstacles from an external wall of the carriage 2.

Advantageously, during the automatic operation in a wrapping cycle, following a stop of the machine 1 due to the temporary presence (less than a defined first time t1) of an obstacle in the first area A, an automatic restart of the machine 1 and thus of the wrapping cycle is performed by the control unit 10, without the need for an operator to be present near the machine to manually reset and restart the machine 1 and the wrapping cycle.

The self-propelled wrapping machine 1 of the invention therefore allows to simplify and speed up the restart procedure following a stop due to the detection of an obstacle.

By virtue of the control unit 10, comprising the first computing unit 11, which manages the alarm signals ALL1, ALL2, ALL3 and the control signals C0, C1, C2, C3, C4, and the second computing unit 12 which drives and controls drive means 25 and actuator means 20, it is possible to efficiently and effectively control the operation of the machine 1 of the invention both during the wrapping cycle and during the manual maneuvering procedure. More precisely, the first computing unit 11 can process the alarm signals coming from the scanning device 30 and the speed and position sensors 31, 32 with sampling times that are further reduced and shorter than those used by the second computing unit 12 to control and command the drive means 25 and the actuator means 20. Thereby, the alarm signals, in particular the obstacle alarm signal ALL1 can be quickly received and processed by the first control unit 11 to command the stop of the machine 1, sending the relative stop signal to the second computing unit 12.

With reference to the flow chart of FIG. 5, the method according to the invention for wrapping a load 100 by means of a self-propelled wrapping machine 1 movable on a supporting plane P and comprising a self-propelled carriage 2 provided with at least one drive wheel 7 operated by actuator means 20, a control unit 10 for controlling the actuator means 20 and at least one scanning device 30, comprises the steps of:

starting (P1) a wrapping cycle in automatic mode in which the self-propelled wrapping machine 1 rotates around the load 100 to wrap it with the film 50;

during the wrapping cycle, scanning (P3) with the scanning device 30 a first area A of the supporting plane P which extends frontally and laterally with respect to the front portion 13 of the carriage 2 in order to detect a possible obstacle in the first area A and in presence of the obstacle generating and sending to the control unit 10 an obstacle alarm signal ALL1;

stopping (P4) the machine 1 and the wrapping cycle if the first area A is occupied by an obstacle, i.e., if an obstacle is detected within the first area A;

measuring (P5) a stay time tp of the obstacle within the first area A;

if the stay time tp is not less than a first time t1, in particular equal to 15 s, stopping the machine 1 in emergency mode (P6) and interrupting the wrapping cycle;

if the stay time tp is less than the first time t1, checking (P7) whether the first area A remains free from an obstacle, i.e., whether an obstacle is detected within the first area A, for a second time t2, in particular equal to 3 s;

if the first area A remains free from obstacles, i.e., if no obstacles are detected within the first area A, during the second time t2 automatically restarting (P8) the machine 1 and resuming the wrapping cycle, in particular by continuing to scan the first area A with the scanning device 30;

if the first area A is occupied by an obstacle, i.e., if an obstacle is detected within the first area A, during the second time t2 then stopping the machine 1 in emergency mode (P6) and interrupting the wrapping cycle.

The method also provides during the wrapping cycle checking an operating state (P9) of the machine 1 and stopping the machine in emergency mode P6 in case of further alarm signals ALL2, ALL3 generated and sent to the control unit 10. In particular, it is provided to stop the machine 1 in emergency mode (P6) in case of a speed alarm signal ALL3 generated when the movement speed V of the machine 1 is not lower than the first limit speed $V_{1max}$, for example equal to 90 m/s.

The method comprises, after said emergency stop (P6), following an alarm signal ALL1, ALL2, ALL3, manually resetting (P10) the alarm signal ALL1, ALL2, ALL3 and then manually restarting (P11) the machine 1 to continue the wrapping cycle.

With reference to the flow chart of FIG. 6, the method according to the invention for controlling a self-propelled wrapping machine 1 in a manual maneuvering procedure in which an operator guides and moves the self-propelled wrapping machine 1 by actuating via a guiding bar 6 on a steering 9 of a guiding system 5 of the said self-propelled wrapping machine 1 and operating, by means of drive buttons 43, 44 positioned on the guiding bar 6, actuator means 20 of the self-propelled wrapping machine 1 adapted to move the wrapping machine on a supporting plane P, comprises the steps of:

positioning the guiding bar 6 in a low operating position to activate the drive buttons 43, 44 and the manual maneuvering procedure (Q1);
  operating (Q2) the drive buttons 43, 44 in order to activate the actuator means 20 and moving the machine 1;
  during said moving, checking (Q3) that the guiding bar 6 is in the low operating position;
  during said moving, checking (Q4) that a movement speed V of the machine 1 is lower than the second maximum speed $V_{max2}$, in particular equal to 50 m/s, and if it is not lower than the second maximum speed $V_{max2}$, generating and sending a speed alarm signal ALL2 to a control unit (10) of the self-propelled wrapping machine 1;
  during said moving, scanning (Q5) with a scanning device 30 of the self-propelled wrapping machine 1 a defined second area B of the supporting plane P that extends frontally and laterally with respect to the front portion 13 of a carriage 2 of the self-propelled wrapping machine 1 in order to detect a possible obstacle in the second area B and generating an obstacle alarm signal ALL1 and sending it to the control unit 10 in case of presence of an obstacle;
  stopping (Q6) the self-propelled wrapping machine 1 and disabling the drive buttons 43, 44 if the guiding bar 6 is not in the low operating position;
  stopping in emergency mode Q7 the self-propelled wrapping machine 1 if an obstacle is detected within the second area B and/or if the movement speed V of the self-propelled wrapping machine 1 is not lower than the second maximum speed $V_{max2}$.

After said stopping (Q6) it is also provided to reactivate the drive buttons 43, 44 when the guiding bar 6 is returned to the low operating position (Q1).

After said emergency stop (Q7), the method comprises manually resetting (Q8) the alarm signal ALL1, ALL3, which caused the emergency stop, and then re-enabling the drive buttons 43, 44 when the guiding bar 6 is returned to the low operating position Q1.

The invention claimed is:

1. A self-propelled wrapping machine movable on a supporting plane to wrap a load with a film, comprising:
  a self-propelled carriage provided with at least one drive wheel and a guiding system comprising at least one steering wheel manoeuvred by a steering that can be manually operated by means of a guiding bar in a manual maneuvering procedure of the self-propelled wrapping machine;
  an upright fixed to said carriage;
  an unwinding unit provided with a reel of film and movable along said upright;
  an actuator system to operate at least said drive wheel and said unwinding unit along said upright;
  a control unit to control at least said actuator system;
  at least one scanning device to scan a defined area of said supporting plane which extends frontally and laterally from a front portion of said carriage in order to detect a possible obstacle in said area and in presence of said obstacle to send an obstacle alarm signal to said control unit to stop said actuator system and said self-propelled wrapping machine;
  wherein said scanning device is configured to scan a first area of said supporting plane during a wrapping cycle of said load that is automatically performed by said self-propelled wrapping machine and a second area during a manual maneuvering procedure of said self-propelled wrapping machine that is performed by an operator, said second area having an extent smaller than the extent of said first area.

2. The self-propelled wrapping machine according to claim 1, comprising a plurality of sensors adapted to detect operating conditions and/or anomalies of the self-propelled wrapping machine and a plurality of control buttons to activate/deactivate operating functions of the self-propelled wrapping machine, said plurality of sensors and control buttons being connected to said control unit.

3. The self-propelled wrapping machine according to claim 2, wherein said control unit comprises a first computing unit connected to said scanning device and to said plurality of sensors and control buttons and suitable for receiving from said scanning device, said sensors and said control buttons respectively alarm signals and control signals and a second computing unit for controlling said actuator system, said first computing unit and said second computing unit being interconnected and communicating to each other, said second computing unit being configured to control said actuator system based on stop signal, start signal, restart signal sent by said first computing unit based on signals received by said scanning device and said plurality sensors and control buttons.

4. The self-propelled wrapping machine according to claim 2, wherein said plurality of sensors comprises at least one speed sensor for detecting a movement speed of said self-propelled wrapping machine and a position sensor for detecting a low operating position of said guiding bar.

5. The self-propelled wrapping machine according to claim 2, wherein said plurality of control buttons comprises at least one emergency button to stop said self-propelled wrapping machine, a cycle start button to start a wrapping cycle performed in automatic mode by said self-propelled wrapping machine, a reset button to reset an alarm signal after an emergency stop, first and second drive buttons associated with said guiding bar at least to control a movement of said self-propelled wrapping machine in the manual maneuvering procedure thereof.

6. The self-propelled wrapping machine according to claim 1, wherein said scanning device is one among laser scanning device, radar, optical, infrared, ultrasonic detecting device.

7. The self-propelled wrapping machine according to claim 1, wherein said first and second areas scanned by said scanning device comprise respective central portions extending frontally from said front portion of said carriage, first lateral portions adjacent to said central portions and interposed between said central portions and said load and second lateral portions adjacent to said central portions and opposite to said load.

8. The self-propelled wrapping machine according to claim 7, wherein at least said first lateral portion of said first area is shaped so as to follow an external outline of a feeler element of said guiding system and said central portions of said first and second areas are shaped so as to enclose said front portion of said carriage.

9. The self-propelled wrapping machine according to claim 7, wherein said central and lateral portions of said first area have a first length, measured along a longitudinal axis of said self-propelled wrapping machine starting from an end of said front portion of said carriage and moving away from the end, between 1000 and 2000 mm.

10. The self-propelled wrapping machine according to claim 7, wherein said central and lateral portions of said second area have a second length, measured along an axis longitudinal of said self-propelled wrapping machine starting from an end of said front portion of said carriage and moving away from the end, between 50 and 800 mm.

11. The self-propelled wrapping machine according to claim 7, wherein said central portions and said second side portions of said first and second areas have a third length, measured along a longitudinal axis of said self-propelled wrapping machine starting from an end of said front portion of said carriage and towards a rear portion thereof, between 100 and 300 mm.

12. The self-propelled wrapping machine according to claim 7, wherein said central portions of said first and second areas have a first width measured along a transverse axis of said self-propelled wrapping machine substantially equal to a width of the carriage.

13. The self-propelled wrapping machine according to claim 7, wherein said first side portion of said first area have a respective second width measured along an transverse axis of said self-propelled wrapping machine substantially equal to a lateral extension distance of said feeler element extending from one side of said carriage toward said load and said second side portion of said second area have a respective second width measured along said transverse axis between 0 mm and a distance substantially equal to said lateral extension distance.

14. The self-propelled wrapping machine according to claim 7, wherein said second lateral portion of said first area has a respective third width measured along a transverse axis of said self-propelled wrapping machine, between 350 and 1600 mm and said second lateral portion of said second area has a respective third width measured along said transverse axis between 0 and 100 mm.

15. A method for wrapping a load by means of a self-propelled wrapping machine, movable on a supporting plane and comprising a self-propelled carriage provided with at least one drive wheel operated by an actuator system, a control unit to control at least said actuator system and at least one scanning device, said method comprising the steps of:
   starting a wrapping cycle in automatic mode in which said self-propelled wrapping machine rotates around a load to wrap it with a film;
   during said wrapping cycle, scanning with said scanning device a first area of the supporting plane which extends frontally and laterally with respect to a front portion of the carriage in order to detect a possible obstacle in said first area and generating an obstacle alarm signal in presence of an obstacle and sending the obstacle alarm signal to the control unit;
   stopping the self-propelled wrapping machine and the wrapping cycle if said first area is occupied by an obstacle;
   measuring a stay time of said obstacle within said first area;
   if said stay time is not shorter than a first time stopping the self-propelled wrapping machine in emergency mode and interrupting the wrapping cycle;
   if said stay time is shorter than said first time checking if said first area remains free from an obstacle for a second time;
   if said first area remains free from obstacles for said second time restarting automatically the self-propelled wrapping machine and resuming the wrapping cycle;
   if said first area is occupied by an obstacle during said second time then stopping in emergency mode the self-propelled wrapping machine and interrupting the wrapping cycle.

16. The method according to claim 15, comprising during said wrapping cycle checking an operating state of said self-propelled wrapping machine and stopping in emergency mode the self-propelled wrapping machine in case of further alarm signals generated and sent to said control unit.

17. The method according to claim 15, comprising, after said stopping in emergency mode due to an alarm signal, resetting said alarm signal and then manually restarting said self-propelled wrapping machine to continue the wrapping cycle.

18. The method according to claim 15, comprising stopping in emergency mode said self-propelled wrapping machine in case of a speed alarm signal generated when a movement speed of said self-propelled wrapping machine is not lower than a first limit speed.

19. A method for controlling a self-propelled wrapping machine movable on a supporting plane in a manual maneuvering procedure in which an operator guides and moves said self-propelled wrapping machine by acting via a guiding bar on a steering of a guiding system of the self-propelled wrapping machine and by operating by means of drive buttons positioned on said guiding bar an actuator system adapted to move on the supporting plane said self-propelled wrapping machine, said method comprising the steps of:
   positioning said guiding bar in a low operating position in order to activate said drive buttons and said manual maneuvering procedure;
   operating the drive buttons in order to activate the actuator system and moving said self-propelled wrapping machine;
   during said moving checking that said guiding bar is in said low operating position;
   during said moving checking that a movement speed of said self-propelled wrapping machine is lower than a second maximum speed and if it is not lower than said second maximum speed generating and sending a speed alarm signal to a control unit of the self-propelled wrapping machine;
   during said moving scanning by means of at least one scanning device of said self-propelled wrapping machine a definite second area of the supporting plane that extends frontally and laterally with respect to a front portion of a carriage of said self-propelled wrapping machine in order to detect a possible obstacle in said second area and generating an obstacle alarm signal and sending it to the control unit in case of presence of an obstacle;
   stopping the self-propelled wrapping machine and disabling said drive buttons if said guiding bar is not in said low operating position;

stopping in emergency mode the self-propelled wrapping machine if an obstacle is detected within said second area and/or if said movement speed of said self-propelled wrapping machine is not lower than said second maximum speed.

20. The method according to claim 19, comprising after said stopping re-enabling said drive buttons when said guiding bar is returned to the low operating position and comprising after said stopping in emergency mode manually resetting the alarm signal which caused the stop in emergency mode and then reactivating-said drive buttons when said guiding bar is returned to the low operating position.

* * * * *